United States Patent
Moon et al.

(10) Patent No.: US 12,232,243 B2
(45) Date of Patent: *Feb. 18, 2025

(54) WIRELESS POWER TRANSMISSION APPARATUS FOR INDUCTION HEATING AND CONTROL METHOD THEREOF

(71) Applicant: LG Electronics Inc., Seoul (KR)

(72) Inventors: Hyunwook Moon, Seoul (KR); Euisung Kim, Seoul (KR); Yangkyeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1027 days.

This patent is subject to a terminal disclaimer.

(21) Appl. No.: 17/186,747

(22) Filed: Feb. 26, 2021

(65) Prior Publication Data

US 2021/0274605 A1 Sep. 2, 2021

(30) Foreign Application Priority Data

Feb. 27, 2020 (KR) .......................... 10-2020-0024270

(51) Int. Cl.
*H05B 6/08* (2006.01)
*H02J 50/12* (2016.01)
*H02J 50/90* (2016.01)
*H02M 5/458* (2006.01)

(52) U.S. Cl.
CPC ................ *H05B 6/08* (2013.01); *H02J 50/12* (2016.02); *H02J 50/90* (2016.02); *H02M 5/4585* (2013.01)

(58) Field of Classification Search
CPC ............. H05B 6/08; H02J 50/90; H02J 50/12
USPC ....................................................... 219/666
See application file for complete search history.

(56) References Cited

U.S. PATENT DOCUMENTS

| 4,996,405 A | 2/1991 | Poumey et al. |
| 2011/0226756 A1 | 9/2011 | Valero et al. |
| 2014/0158680 A1* | 6/2014 | Kitaizumi ............... H02J 50/10 219/665 |

(Continued)

FOREIGN PATENT DOCUMENTS

| JP | 2016-046122 A | 4/2016 |
| KR | 10-2019-0043985 A | 4/2019 |

OTHER PUBLICATIONS

Extended European Search Report in European Appln. No. 21159341.3, dated Jul. 23, 2021, 7 pages.

(Continued)

*Primary Examiner* — Phuong T Nguyen
(74) *Attorney, Agent, or Firm* — Fish & Richardson P.C.

(57) ABSTRACT

A wireless power transmission apparatus for induction heating includes: a working coil that is configured to change operation based on selection of a mode of operation from among a plurality of operating modes, the plurality of operating modes including a wireless power transmission mode configured to wirelessly transmit power and a heating mode configured to heat one or more objects, an inverter that is configured to output, to the working coil, current at an operation frequency, and a controller. The controller is configured to calculate an eccentricity degree between the working coil and a reception coil of a target object and control, in the wireless power transmission mode, the operation frequency based on the calculated eccentricity degree in a preparation period prior to wireless power transmission to the target object.

8 Claims, 12 Drawing Sheets

(56) References Cited

U.S. PATENT DOCUMENTS

| | | | |
|---|---|---|---|
| 2015/0260550 A1* | 9/2015 | Harrison | F04D 15/0088 324/654 |
| 2019/0131824 A1 | 5/2019 | Suga et al. | |
| 2019/0366866 A1 | 12/2019 | Cha et al. | |

OTHER PUBLICATIONS

Office Action in Korean Appln. No. 10-2020-0024270, mailed on Jul. 29, 2024, 11 pages.

\* cited by examiner

WIRELESS POWER TRANSMISSION APPARATUS FOR INDUCTION HEATING AND CONTROL METHOD THEREOF

CROSS-REFERENCE TO THE RELATED APPLICATION

The present disclosure claims priority to and the benefit of Korean Patent Application No. 10-2020-0024270, filed on Feb. 27, 2020, in the Korean Intellectual Property Office, the disclosure of which is incorporated herein by reference in its entirety.

TECHNICAL FIELD

The present disclosure relates to a wireless power transmission apparatus, and more particularly, to a wireless power transmission apparatus for induction heating and a control method thereof.

BACKGROUND

Wireless charging refers to a method of charging a device by wirelessly transmitting power through the atmosphere instead of a method of charging a device by transmitting power through a wire.

According to the basic principle of wireless charging, when alternating current (AC) flows into a transmission coil, a battery is charged by forming a magnetic field around the transmission coil, allowing AC to flow in a reception coil due to influence of the magnetic field, and rectifying the AC.

Various small-size kitchen utensils are used in a kitchen, that is, small home appliances require power supply, and thus, the appliances receive power by connecting an electric cord (power connection cable) that is separately included in the appliances to a socket. In this case, there is a problem in that a plurality of electric cords adversely affects management, safety, or space utilization.

Thus, recently, the demand for wireless power charging of small home appliances used in a kitchen has rapidly increased.

For example, devices that need to be heated using induced current among the small home appliances have increasingly been spread.

Such a heating device using induced current uses an induction method of heating the device via electron induction by generating a magnetic field and is operated in the same way as an electric range.

For example, a general electron induction heating device allows high-frequency current to flow in a working coil or heating coil installed therein.

When the high-frequency current flows in the working coil or the heating coil, a strong line of magnetic force is generated. The line of magnetic force generated in the working coil or the heating coil forms eddy current while being transmitted through a cooking tool. Thus, as eddy current flows in a cooking tool, heat is generated to heat a container itself, and materials in the container are heated as the container is heated.

As such, there is the increasing demand for a multi-functional wireless power transmission device that is capable of performing induction heating or wireless charging depending on a type of the small home appliance.

The multi-functional wireless power transmission device is capable of performing induction heating or wireless power transmission by changing a frequency using one working coil or heating coil according to a mode selected by a user.

When induction heating or wireless power transfer is performed on a target small home appliance of a multi-functional wireless power transmission device, a reception and a working coil of the target small home appliance need to be aligned with each other.

That is, when the two coils that perform wireless power transfer are not aligned with each other and are eccentrically arranged, power transmission efficiency is remarkably lowered.

To this end, technologies of determining eccentricity and providing an alarm therefor or compensating for this in wireless power transfer are proposed.

For example, a conventional battery charging system for a vehicle through wireless power transfer is introduced, which discloses that information regarding a charging state of a reception side is received, and when a charging state value is less than a reference value, an alignment state is adjusted by moving a coil of the reception to achieve a concentricity state.

However, for the conventional battery charging system, it is required to change the coil of the reception side for alignment. However, in the case of wireless power transfer of a small home appliance, it is required to continuously provide an alarm to a user to match a state of transmission/reception coils with concentricity, and alignment state match is a factor that impedes use convenience of a wireless small home appliance.

A conventional device including a magnetic component at a reception side is introduced to solve such problem. For example, the magnetic component is automatically aligned with a transmission coil by allowing DC current to flow when an alignment state of transmission/reception coils is not matched in a wireless power transmission system.

As such, when a reception coil includes a magnetic component, a metallic foreign object may be attached thereto together, and thus, there is a risk of ignition or fuming due to a magnetic field generated during wireless power transfer.

SUMMARY

According to one aspect of the subject matter described in this application, a wireless power transmission apparatus for induction heating includes a working coil that is configured to change operation based on selection of a mode of operation from among a plurality of operating modes, the plurality of operating modes including a wireless power transmission mode configured to wirelessly transmit power and a heating mode configured to heat one or more objects, an inverter that is configured to output, to the working coil, current at an operation frequency, and a controller. The controller can be configured to calculate an eccentricity degree between the working coil and a reception coil of a target object and control, in the wireless power transmission mode, the operation frequency based on the calculated eccentricity degree in a preparation period prior to wireless power transmission to the target object.

Implementations according to this aspect can include one or more of the following features. For example, the controller can operate in the preparation period prior to a normal wireless power transmission mode configured to perform the wireless power transmission to the target object, and the controller can be configured to determine, in the preparation period, (i) whether the target object includes the reception coil and (ii) the eccentricity degree.

In some implementations, the wireless power transmission apparatus can further include an upper glass arranged to receive the target object and an input unit configured to receive the selection of the mode of operation. In some examples, the controller can be further configured to enter an eccentricity detection mode to control the operation frequency and determine (i) whether the target object includes a reception coil and (ii) the eccentricity degree.

In some examples, the controller can be configured to read resonance current of the working coil, and determine (i) whether the target object includes the reception coil and (ii) the eccentricity degree in the eccentricity detection mode. In some examples, the controller can be configured to read the resonance current a plurality of times for a predetermined time, perform integration on the resonance current, and determine (i) whether the target object includes the reception coil and (ii) the eccentricity degree based on an integrated value of the resonance current.

In some implementations, the controller can be configured to compensate for the integrated value of the resonance current depending on amplitude of main power of the wireless power transmission apparatus for induction heating. In some examples, the controller can be configured to calculate the compensated integrated value with respect to the integrated value of the resonance current, and based on the compensated integrated value being less than a first threshold value, determine that the target object includes the reception coil.

In some examples, wherein the eccentricity degree can be calculated based on the integrated value of the resonance current, and based on the calculated eccentricity degree being equal to or less than a second threshold value, the operation frequency can be controlled depending on the eccentricity degree. In some implementations, the controller can be configured to count the resonance current at a zero-voltage point of the main power.

In some implementations, the operation frequency can be controlled to be swept to a last operation frequency by lowering a start frequency for wireless power transmission as the eccentricity degree is increased. In some implementations, the operation frequency can be controlled to be swept to a last operation frequency by setting a deviation for sweep from a start frequency for wireless power transmission to be increased as the eccentricity degree is increased.

According to another aspect of the subject matter described in this application, a method of operating a wireless power transmission apparatus for induction heating, which includes a working coil that is configured to change operation, based on selection of a mode of operation from among a plurality of operating modes, the plurality of operating modes including a wireless power transmission mode configured to wirelessly transmit power and a heating mode configured to heat one or more objects, includes checking whether the wireless power transmission mode is selected, a preparation operation including (i) detecting a target object, (ii) determining an eccentricity degree between the target object and the working coil, and (iii) setting an operation frequency of an inverter for the wireless power transmission, and a normal operation mode operation including performing the wireless power transmission at the operation frequency to the target object.

Implementations according to this aspect can include one or more following features. For example, the preparation operation can include detecting resonance current while driving the inverter at a first operation frequency and determining whether the target object includes a reception coil, calculating an eccentricity degree between the reception coil and the working coil based on the resonance current, and controlling the operation frequency for the wireless power transmission based on the eccentricity degree.

In some implementations, the method can further include based on the resonance current being detected, reading the resonance current a plurality of times for a predetermined time, performing integration on the resonance current, and determining whether the target object includes the reception coil based on an integrated value of the resonance current. In some examples, the method can further include compensating for the integrated value of the resonance current depending on amplitude of main power of the wireless power transmission apparatus for induction heating.

In some examples, the method can further include based on the compensated integrated value being less than a first threshold value, determining that the target object includes the reception coil. In some implementations, the method can further include calculating the eccentricity degree based on the integrated value of the resonance current, and based on the calculated eccentricity degree being equal to or less than a second threshold value, controlling the operation frequency depending on the eccentricity degree.

In some implementations, controlling the operation frequency can include controlling the operation frequency to be swept to a last operation frequency by lowering a start frequency for wireless power transmission as the eccentricity degree is increased. In some implementations, controlling the operation frequency can include controlling the operation frequency to be swept to a last operation frequency by setting a deviation for sweep from a start frequency for wireless power transmission to be increased as the eccentricity degree is increased.

DETAILED DESCRIPTION

Figure 1:
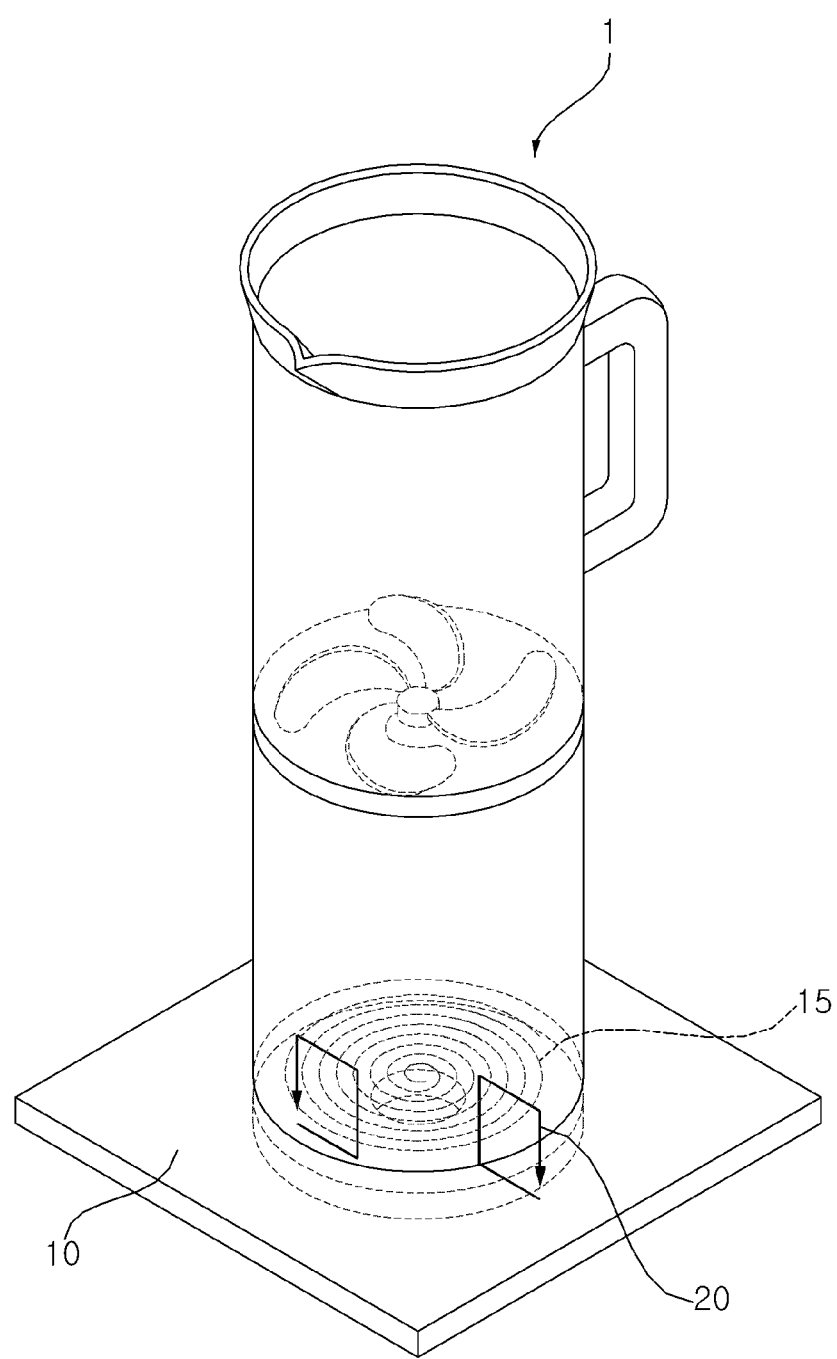
FIG. 1 is a diagram illustrating an upper perspective view of an exemplary wireless power transmission apparatus for induction heating.
Figure 2:
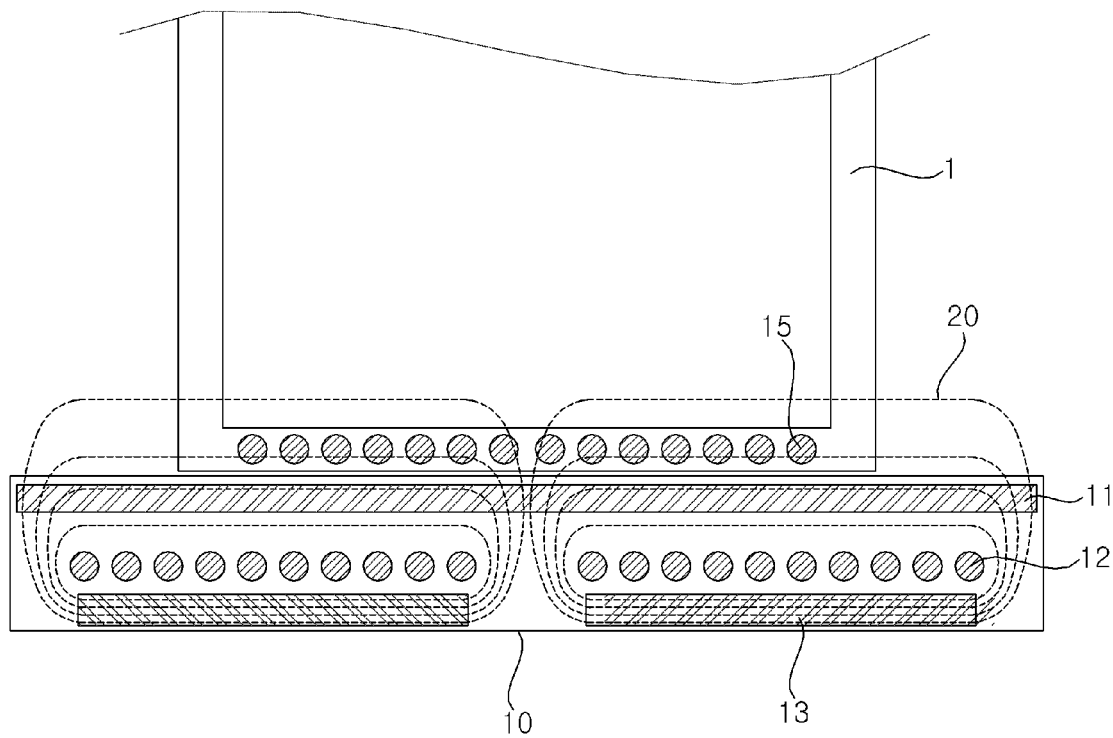
FIG. 2 is a diagram illustrating a cross-sectional view of the exemplary wireless power transmission apparatus for induction heating of FIG. 1.
Figure 3:
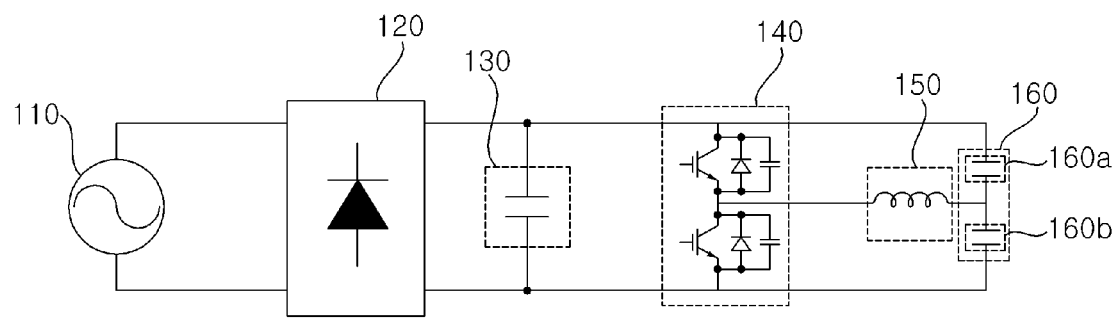
FIG. 3 is a circuit diagram for explaining an induction heating state.
Figure 4:
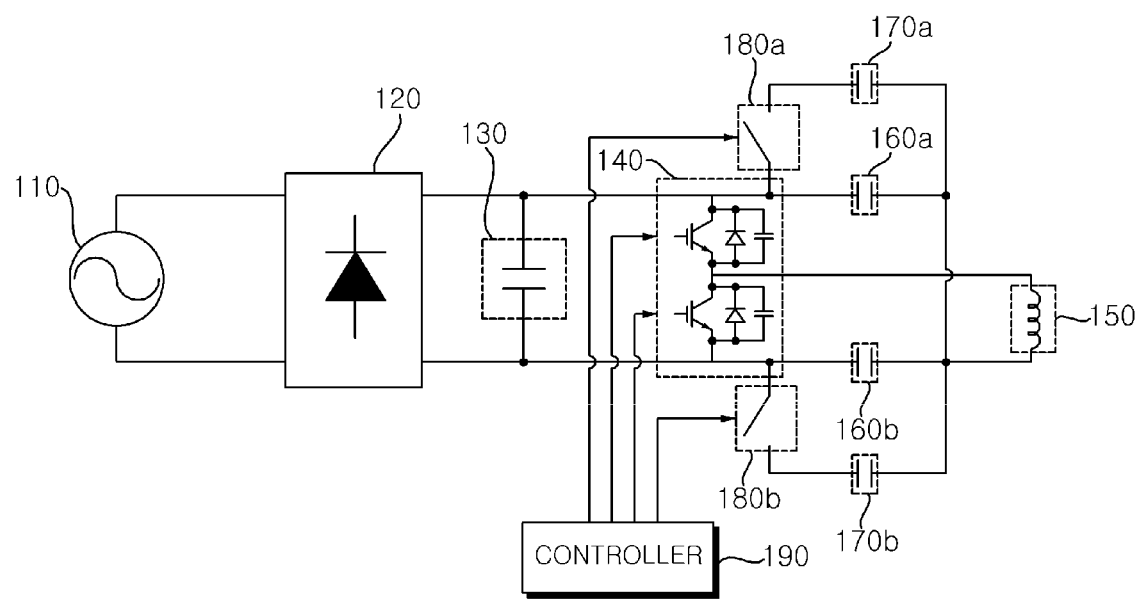
FIG. 4 is a circuit diagram for explaining wireless power transfer (WPT) of an exemplary wireless power transmission apparatus for induction heating.

FIG. 1 is a diagram illustrating an upper perspective view of an exemplary wireless power transmission apparatus 10 for induction heating. FIG. 2 is a diagram illustrating a cross-sectional view of the exemplary wireless power transmission apparatus 10 for induction heating of FIG. 1. FIG. 3 is a circuit diagram for explaining an induction heating state. FIG. 4 is a circuit diagram for explaining wireless power transfer (WPT) of the exemplary wireless power transmission apparatus 10 for induction heating.

Referring to FIGS. 1 and 2, a target object 1 can be positioned on a wireless power transmission apparatus 10. The wireless power transmission apparatus 10 can heat the target object 1 positioned thereon or can wirelessly transmit power to the target object 1.

The target object 1 can be a small home appliance having a reception coil 15, a small home appliance that does not have the reception coil 15, a general heating cooking container that is not an electronic product, or a foreign object.

The small home appliance having the reception coil 15 can wirelessly receive power using the reception coil 15 through the wireless power transmission apparatus 10 and can perform a main operation using the corresponding power. For example, the small home appliance can be a wireless blender or a wireless oven toaster.

The small home appliance that does not have the reception coil 15 can be a home appliance that is directly heated by generating a magnetic field through a working coil 12, which is a transmission coil of the wireless power transmission apparatus 10, and can be an electronic product that is not a general cooking container. An example thereof may be a wireless electric kettle or a wireless electric rice cooker. The small home appliance that does not have the reception coil 15 can include a pickup coil to supply power to a module that requires driving power from a region for performing a main operation, that is, a region except for a region that receives heat and performs a function. The pickup coil can be positioned away from a region corresponding to the working coil 12 that is a transmission coil, and can wirelessly receive power and can supply power to a module, for example, a control module such as a communication module, an interface, or a display.

The general cooking container may refer to a container including an electrical resistance component that can be heated by a magnetic field 20 generated from the working coil 12 and through which the magnetic field 20 passes. When a material of the cooking container includes an electrical resistance component, the magnetic field 20 can generate eddy current in the cooking container. The eddy current can heat the heating container, and the heat can be conducted and transmitted to an internal side of the cooking container. Thus, contents in the cooking container can be cooked.

When a foreign object is positioned at a position of the target object 1, the foreign object tends to be a material having an electrical resistance component that impedes wireless power transfer (WPT) and may be an iron bar such as a spoon or a chopstick.

The wireless power transmission apparatus 10 can function as an electronic induction heating apparatus or a wireless power transmission apparatus according to user's selection.

For example, the wireless power transmission apparatus 10 can function in an induction heating mode for heating a general heating container or can function in a wireless power transmission mode for wirelessly transmitting power to a small home appliance that has or does not have the reception coil 15 with respect to one working coil 12 according to the user's selection.

The multi-functional wireless power transmission apparatus 10 can include an upper glass 11 and a casing including at least on working coil 12, as shown in FIG. 2. First, components included in the wireless power transmission apparatus 10 will be described in detail.

The upper glass 11 can protect an internal part of the wireless power transmission apparatus 10 and can support the target object 1. For example, the upper glass 11 can be made of tempered glass of a ceramic material obtained by synthesizing various minerals. Thus, the upper glass 11 can protect an internal part of the wireless power transmission apparatus 10 from the outside. The upper glass 11 can support the target object 1 positioned thereon. Thus, the target object 1 can be positioned on the upper glass 11.

The working coil 12 can wirelessly transmit power to the target object 1 depending on the type of the target object 1 or a user mode selection, or can generate a magnetic field for heating, and at least one working coil 12 can be configured according to a design. In some implementations, a region in which the target object 1 is disposed can be determined depending on each coil 12.

A user input unit for determining a mode of the wireless power transmission apparatus can be disposed at one side of the upper glass 11.

For example, the working coil 12 can be disposed below the upper glass 11. Current may or may not flow in the working coil 12 depending on power on/off state of the wireless power transmission apparatus 10. When current flows in the working coil 12, the amount of current flowing in the working coil 12 can also vary depending on the mode and output of the wireless power transmission apparatus 10.

When current flows in the working coil 12, the working coil 12 can generate the magnetic field 20. As the amount of current flowing in the working coil 12 is increased, the generated magnetic field 20 can also increase.

A direction of the magnetic field 20 generated by the working coil 12 can be determined depending on a direction of the current flowing in the working coil 12. Thus, when alternating current (AC) flows in the working coil 12, the direction of the magnetic field 20 can be converted by a frequency of the AC. For example, when AC of 60 Hz flows in the working coil 12, the direction of the magnetic field can be converted 60 times per second.

A driving module that is electrically connected to the user input unit and the working coil 12, can receive a voltage and current from a commercially available power source, can convert the received voltage and current, and can supply power to the working coil 12 according to user input. In some implementations, the driving module can be disposed in the casing.

In some implementations, the driving module can be a plurality of chips installed on one printed circuit board. In some implementations, the driving module can be one integrated chip.

The wireless power transmission apparatus 10 can include ferrite 13 that can protect the driving module.

For example, the ferrite 13 can function as a shield that blocks influence of the magnetic field generated by the working coil 12 or an electromagnetic field generated outside of the working coil 12 on the driving module in the wireless power transmission apparatus 10.

To this end, the ferrite 13 can be made of a material with very high permeability. The ferrite 13 can guide the magnetic field introduced into the wireless power transmission apparatus 10 to flow through the ferrite 13 rather than being discharged.

In some implementations, the wireless power transmission apparatus 10 can include at least one working coil 12. In some implementations, the wireless power transmission apparatus 10 can include more than one working coils 12.

The respective working coils 12 can have different sizes, and current of specific frequency can flow in each working coil 12 through inverter-driving under control of the driving module, and thus, in the induction heating mode, target power corresponding to a firepower level selected by a user can be generated and heat corresponding to the target power can be generated.

In the wireless power transmission mode, current of different frequencies can flow through inverter-driving under control of the driving module, and thus, power can be wirelessly transmitted to a small home appliance.

To this end, the respective working coils 12 can be connected to inverters in the driving module, and the plurality of working coils 12 can be connected in parallel or series to each other by a switch and can be connected to an inverter.

When the corresponding wireless power transmission apparatus 10 is operated in the induction heating mode according to user selection, a magnetic field can be generated by current of a predetermined frequency and can be transmitted through a heating container positioned on the upper glass 11.

In some implementations, when an electrical resistance component is included in a material of a cooking container, the magnetic field can generate eddy current in the cooking container. The eddy current can heat the cooking container, and the heat can be conducted and transmitted to an internal side of the cooking container. Thus, the induction heating mode can proceed in a method of cooking contents in the cooking container.

Movement of the magnetic field generated in the working coil 12 by the ferrite 13 is shown in FIG. 2.

With reference to a circuit diagram in which the wireless power transmission apparatus 10 is operated in the induction heating mode, the wireless power transmission apparatus 10 can have a structure shown in FIG. 3.

For example, FIG. 3 is a circuit diagram of a wireless power transmission apparatus in an electromagnetic induction heating mode when the wireless power transmission apparatus includes an inverter 140 and an working coil 12 (hereinafter, referred to as 150). The wireless power transmission apparatus 10 in the electromagnetic induction heating mode can include a rectifier 120, a direct current (DC) link capacitor 130, an inverter 140, the working coil 12 (150), and a resonance capacitor 160.

An external power source 110 can be an alternating current (AC) input power source. The external power source 110 can supply AC power to an electromagnetic induction heating cooking device. For example, the external power source 110 can supply AC voltage to the rectifier 120 of the electromagnetic induction heating cooking device.

The rectifier 120 can be an electrical circuit for converting AC into DC and can convert AC voltage supplied through the external power source 110 into DC voltage. In some implementations, opposite ends of DC output through the rectifier 120 can refer to DC links. A voltage measured at the DC opposite ends can refer to a DC link voltage. When a resonance curve is not changed, output power can be varied depending on a DC link voltage. The DC link capacitor 130 can function as a buffer between the external power source 110 and the inverter 140. For example, the DC link capacitor 130 can maintain the DC link voltage converted through the rectifier 120 and can supply the voltage to the inverter 140.

The inverter 140 can switch a voltage applied to the working coil 12 (150) and can allow high-frequency current to flow in the working coil 12 (150). For example, the inverter 140 can drive a switching device including an insulated gate bipolar transistor (IGBT) and can allow high-frequency current to flow in the working coil 12 (150), and thus, a high-frequency magnetic field can be formed in the working coil 12 (150).

Current may or may not flow in the working coil 12 (150) according to whether the switching device is driven. For example, when current flows in the working coil 12 (150), a magnetic field can be generated. As current flows in the working coil 12 (150), a magnetic field can be generated to heat a cooking container.

As such, in the electromagnetic induction heating mode, the wireless power transmission apparatus 10 can heat the cooking container using the working coil 12 (150) in electromagnetic induction.

When the wireless power transmission apparatus 10 functions in a wireless power transmission mode, the working coil 12 (150) used in inductive heating can be used in wireless power transfer (WPT) in the same way.

Wireless power transfer (WPT) refers to technology of transmitting power without wire. A method used in wireless power transfer (WPT) can include a magnetic induction (MI) method or a magnetic resonance (MR) method. The magnetic induction (MI) method can use a magnetic induction phenomenon between a primary coil and a secondary coil. For example, when current is injected into a primary (transmission) coil, a magnetic field can be generated. Induced current can be generated in the secondary (reception) coil by the magnetic field generated in the primary coil. The induced current generated in the secondary coil can charge a battery. The magnetic field generated using a magnetic induction method may be weak, and thus, the primary coil and the secondary coil need to be positioned adjacent to each other in order to charge the battery.

The magnetic resonance (MR) method is a method in which primary and secondary coils transmit and receive power using the same frequency. For example, when a magnetic field that oscillates at a resonance frequency is generated in the primary coil, the secondary coil can be designed at the same resonance frequency as the magnetic field generated in the primary coil and can receive energy. In some implementations, it can be possible to charge the battery at a relatively long distance.

As such, a corresponding function can be selectively performed according to user mode selection using the same structure by using a coil used in wireless power transfer (WPT) as the working coil 12 used in the induction heating mode.

Referring back to FIG. 3, one side of the working coil 12 (150) can be connected to a node of a switching device of the inverter 140, and the other side of the working coil 12 (150) can be connected to the resonance capacitor 160. The switching device can be driven by a controller 190 (see FIG. 4) and can be controlled according to a switching time output from the controller 190, and as the switching device is alternately operated, a high-frequency voltage can be applied to the working coil 12 (150). An on/off time of the switching device applied from the controller 190 can be controlled to be gradually compensated for, and thus, a voltage applied to the working coil 12 (150) can be changed to a high voltage from a low voltage.

The controller 190 can control an overall operation of the wireless power transmission apparatus 10. For example, the controller 190 can control each component included in the wireless power transmission apparatus 10. The resonance capacitor 160 can be a component that functions as a buffer. The resonance capacitor 160 can adjust a saturation voltage increase rate while the switching device is turned off and can affect energy loss during a turn-off time. The resonance capacitor 160 can include a plurality of capacitors 160*a* and 160*b* that are connected in series to each other between the working coil 12 (150) and the DC opposite ends to which a voltage from the rectifier 120 is output. The resonance capacitor 160 can include a first resonance capacitor 160*a* and a second resonance capacitor 160*b*. For example, a first end of the first resonance capacitor 160*a* can be connected to a first end to which a voltage from the rectifier 120 is output, and a second end can be connected to a node of the working coil 12 (150) and the second resonance capacitor 160*b*. Similarly, a first end of the second resonance capacitor 160*b* can be connected to the second end to which a low voltage is output from the rectifier 120, and a second end can be connected to the node of the working coil 12 (150) and the first resonance capacitor 160*a*.

Capacitance of the first resonance capacitor 160*a* can be the same as capacitance of the second resonance capacitor 160*b*.

Depending on capacitance of the resonance capacitor 160, a resonance frequency of the wireless power transmission apparatus 10 can be determined.

For example, the resonance frequency of the wireless power transmission apparatus 10 configured as the circuit diagram shown in FIG. 3 can be determined depending on inductance of the working coil 12 (150) and capacitance of the resonance capacitor 160. A resonance curve can be formed based on the resonance frequency determined depending on the inductance of the working coil 12 (150) and the capacitance of the resonance capacitor 160. The resonance curve can represent output power depending on a frequency.

A quality (Q) factor can be determined depending on an inductance value of the working coil 12(150) included in the multi-functional wireless power transmission apparatus 10 and a capacitance value of the resonance capacitor 160. The resonance curve can be differently formed depending on the Q factor. A frequency at which maximum power is output can refer to a resonance frequency (f0), and the wireless power transmission apparatus can use a frequency of a right region based on the resonance frequency (f0) of the resonance curve. Thus, the wireless power transmission apparatus 10 can reduce a frequency to lower a firepower stage and can increase the frequency to increase the firepower stage. The wireless power transmission apparatus 10 can adjust such a frequency and can adjust output power. The wireless power transmission apparatus 10 can use a frequency corresponding to a range to a second frequency from a first frequency. For example, the wireless power transmission apparatus can change a current frequency to any one frequency included in the range to the second frequency from the first frequency and can adjust firepower. The first frequency as a minimum frequency and the second frequency as a maximum frequency that are to be controlled by the wireless power transmission apparatus 10 can be preset. For example, the first frequency can be 20 kHz and the second frequency can be 75 kHz.

As the first frequency is set as 20 kHz, the wireless power transmission apparatus 10 can limit the case in which an audible frequency (about 16 Hz to 20 kHz) is used. Thus, noise of the wireless power transmission apparatus 10 cab be reduced. In some implementations, the second frequency can be set to an IGBT maximum switching frequency. The IGBT maximum switching frequency can refer to a maximum frequency for driving in consideration of internal pressure, capacitance, and the like of the IGBT switching device. For example, the IGBT maximum switching frequency can be 75 kHz.

As such, a frequency that is generally used to heat a cooking took by induction heating in the wireless power transmission apparatus 10 can be between 20 kHz to 75 kHz.

A frequency used in wireless power transfer (WPT) can be different from a frequency used for induction heating the cooking container by the wireless power transmission apparatus 10. For example, the frequency used in wireless power transfer (WPT) can be a frequency with a higher band than a frequency used to heat a cooking container by the wireless power transmission apparatus.

Thus, the wireless power transmission apparatus can provide both a cooking tool heating function and a wireless power transfer (WPT) function through the same working coil 12 (150) by adjusting a resonance frequency.

FIG. 4 is an example of a circuit diagram of the case in which a wireless power transmission apparatus is operated in a wireless power transmission mode.

FIG. 4 shows an example of the wireless power transmission apparatus 10 that selectively provides a cooking container induction heating mode and a wireless power transmission mode.

The wireless power transmission apparatus 10 can include the rectifier 120, the DC link capacitor 130, the inverter 140, the working coil 12 (150), the resonance capacitors 160*a* and 160*b*, WPT capacitors 170*a* and 170*b*, and mode conversion switches 180*a* and 180*b*.

The same description as the description given with reference to FIG. 3 is omitted here.

The working coil 12 (150) can generate a magnetic field as current flows therein. In some implementations, the magnetic field generated in the working coil 12 (150) can heat the target object 1 of a secondary side as being transmitted through the cooking container of the secondary side.

In some implementations, the magnetic field generated by the working coil 12 (150) can transmit power to a small home appliance of the secondary side as being transmitted through the small home appliance of the secondary side.

The resonance capacitors 160*a* and 160*b* can be the same as in the description given with reference to FIG. 3. That is, the resonance capacitors 160*a* and 160*b* shown in FIG. 4 can be the same as the resonance capacitor included in the wireless power transmission apparatus 10 as described above with reference to FIG. 3.

As the wireless power transmission apparatus 10 is operated in a wireless power transmission mode or a cooking container induction heating mode, the resonance capacitors 160*a* and 160*b* may or may not be connected in parallel to the WPT capacitors 170*a* and 170*b*.

In some implementations, the WPT capacitors 170*a* and 170*b* can be connected in parallel to the resonance capacitors 160*a* and 160*b*. The WPT capacitors 170*a* and 170*b* can be a component for lowering a resonance frequency of the wireless power transfer (WPT) to operate an electromagnetic induction heating cooking device 100 in the wireless power transmission mode. For example, when the wireless power transmission apparatus 10 is operated in the cooking container induction heating mode, the WPT capacitors 170*a* and 170*b* may not be connected to the resonance capacitors 160*a* and 160*b*. By way of further example, when the wireless power transmission apparatus 10 is operated in the wireless power transmission mode, the WPT capacitors 170a and 170b can be connected in parallel to the resonance capacitors 160a and 160b. When the WPT capacitors 170a and 170b are connected in parallel to the resonance capacitors 160a and 160b, composite capacitance can increase. When the composite capacitance increases, the resonance frequency (f0) can be reduced according to Equation 1 below.

For example, when the electromagnetic induction heating cooking device 100 is operated in the wireless power transmission mode, the resonance frequency (f0) can be reduced. As such, the wireless power transmission apparatus 10 can reduce the resonance frequency (f0) and can wirelessly transmit power to a product of a secondary side using the original inverter 140 and working coil 12 (150).

The WPT capacitors 170a and 170b can include the first WPT capacitor 170a and the second WPT capacitor 170b. In some implementations, the first WPT capacitor 170a can be connected in parallel to the first resonance capacitor 160a, and the second WPT capacitor 170b can be connected in parallel to the second resonance capacitor 160b.

Capacitance of the first WPT capacitor 170a can be the same as capacitance of the second WPT capacitor 170b.

The mode conversion switches 180a and 180b can determine whether the WPT capacitors 170a and 170b and the resonance capacitors 160a and 160b are connected in parallel to each other. For example, the mode conversion switches 180a and 180b can perform control to connect or not connect the WPT capacitors 170a and 170b in parallel to the resonance capacitors 160a and 160b.

For example, when the mode conversion switches 180a and 180b are turned on, a circuit can be shorted, and the WPT capacitors 170a and 170b and the resonance capacitors 160a and 160b can be connected in parallel to each other. Thus, as described above, the resonance frequency (f0) can be reduced.

In some implementations, when the mode conversion switches 180a and 180b are turned off, the circuit can be open, and the WPT capacitors 170a and 170b may not be connected to the resonance capacitors 160a and 160b. Thus, the resonance frequency (f0) may not be changed.

The mode conversion switches 180a and 180b can include the first mode conversion switch 180a and the second mode conversion switch 180b, and the first mode conversion switch 180a and the second mode conversion switch 180b can be simultaneously operated. The first mode conversion switch 180a can determine whether the first WPT capacitor 170a and the first resonance capacitor 160a are connected in parallel to each other, and the second mode conversion switch 180b can determine whether the second WPT capacitor 170b and the second resonance capacitor 160b are connected in parallel to each other.

In some implementations, the mode conversion switches 180a and 180b can be controlled depending on an operation mode, and can be operated in the wireless power transmission mode or the induction heating mode through the same working coil 12 (150).

For example, one mode of the two modes can be selectively operated through a user input unit according to user selection.

The wireless power transmission apparatus 10 can further include the controller 190 for controlling on and off of the conversion switches 180a and 180b depending on such mode selection, controlling on and off a switching device of the inverter 140, and controlling an overall operation of a driving module.

In some implementations, when the induction heating mode is selected using a user input unit, the controller 190 of the wireless power transmission apparatus 10 can be operated in the induction heating mode, and the conversion switches 180a and 180b can be turned off to perform induction heating.

In some implementations, when the wireless power transmission mode of the target object 1 is selected using the user input unit, the wireless power transmission apparatus 10 can be operated in the wireless power transmission mode, the conversion switches 180a and 180b can be turned on, and wireless power transfer (WPT) can be performed at a resonance frequency based on composite capacitance.

In some implementations, the wireless power transmission apparatus 10 needs to perform whether the target object 1 positioned on the upper glass 11 is capable of wirelessly transmitting power.

Even if a user selects the wireless power transmission mode through the user input unit, when the target object 1 positioned on the wireless power transmission apparatus is an electronic product that is not capable of performing wireless power transfer (WPT) or a small home appliance having no reception coil but not a small home appliance having a reception coil, the wireless power transmission apparatus 10 can differently perform the operation.

When the operation is performed based on only mode selection information received through the user input unit, overcurrent may flow in the target object 1 having no reception coil, or in the case of a foreign object, a waste of electricity may also be caused due to overcurrent and high heat may be accompanied, and thus, the apparatus may be damaged.

Thus, even if selection information of the wireless power transmission mode is received through the user input unit, a procedure of determining whether the target object 1 is for executing the corresponding mode may be required.

Hereinafter, the procedure of determining the target object 1 in a wireless power transmission mode will be described in detail.

Figure 5:
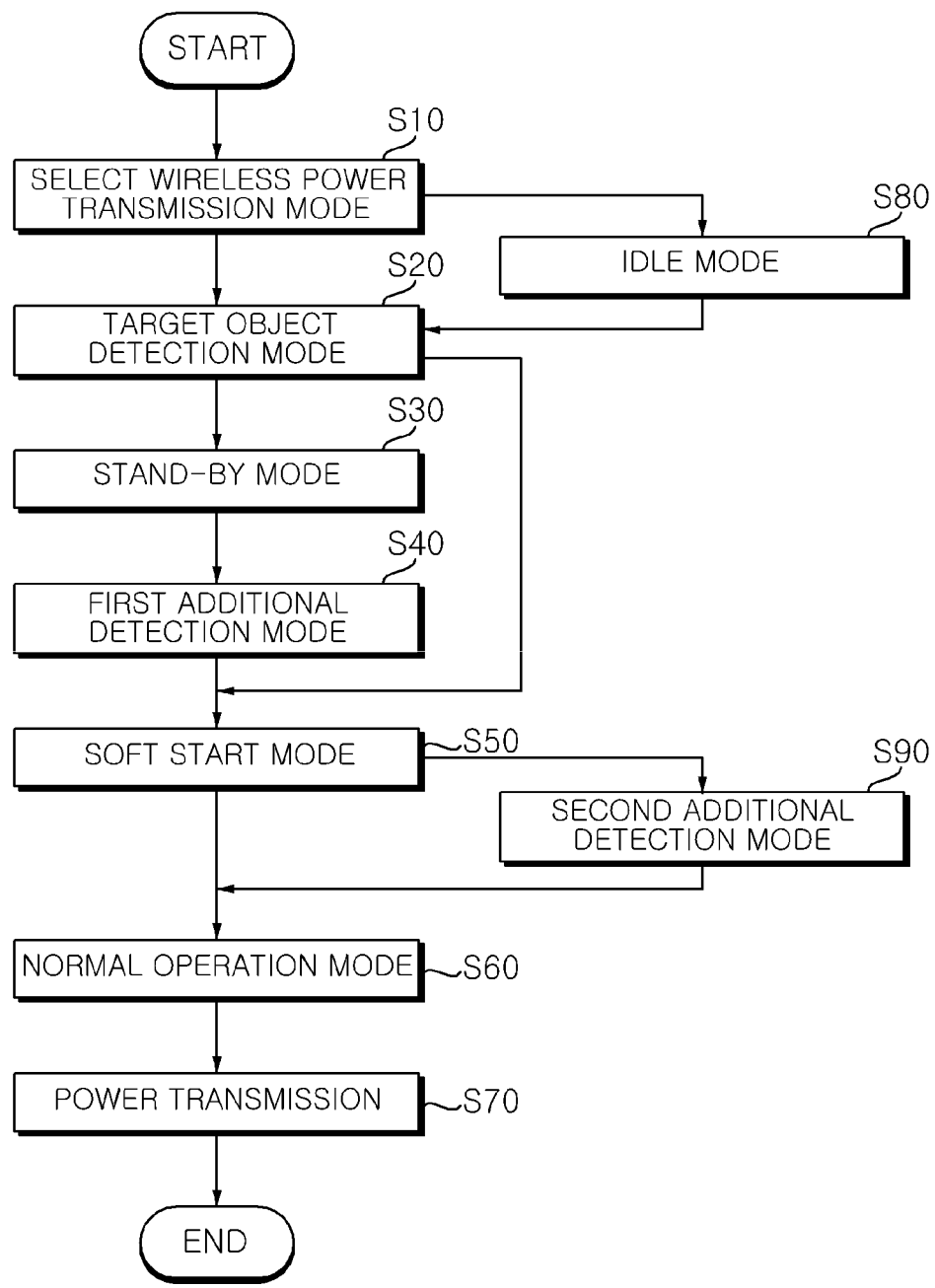
FIG. 5 is a schematic flowchart of a mode of an exemplary wireless power transmission apparatus for induction heating.
Figure 6:
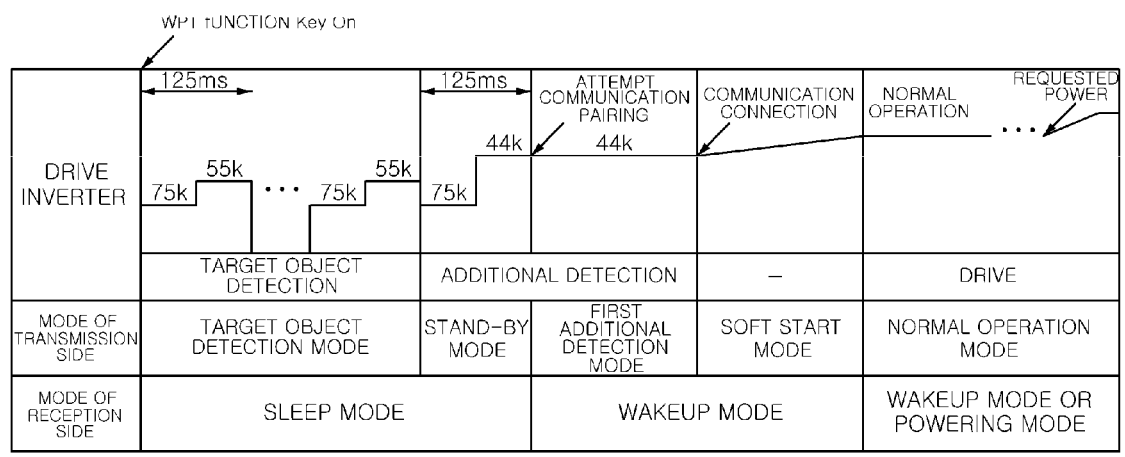
FIG. 6 is a diagram illustrating a structure of a transmission apparatus and a reception apparatus with respect to the flowchart of FIG. 5

FIG. 5 is a schematic flowchart of a mode of a wireless power transmission apparatus for induction heating. FIG. 6 is a diagram showing a structure of a transmission apparatus and a reception apparatus with respect to the flowchart of FIG. 5.

Referring to FIGS. 5 and 6, when the controller 190 receives selection information corresponding to selection of an icon or a button of a wireless power transmission mode by selecting the icon or the button from a user input unit, the wireless power transmission apparatus for induction heating can be converted into the wireless power transmission mode and can perform an operation.

The wireless power transmission apparatus 10 for induction heating can have a preparation period through a plurality of operations to a normal operation mode S60, that is, an operation of wirelessly emitting power towards the reception target object 1.

The wireless power transmission apparatus 10 for induction heating can perform detection for identifying the target object 1 positioned on the upper glass 11 in the preparation period prior to the normal operation mode.

For example, the target object 1 can be identified whether the target object 1 is (i) a small home appliance having a reception coil, (ii) a small home appliance that is directly heated without a reception coil and has only a pick up coil, (iii) a general heating container, (iv) a foreign object, or (v) in a no-load state in which there is nothing.

In some implementations, identification of the target object 1 can be sequentially performed while performing preparation to the normal operation mode S60 in a preparation rather than being simultaneously performed in a single operation.

For example, when receiving mode selection information (S10), the wireless power transmission apparatus 10 can enter an eccentricity detection mode S20 in terms of a transmission side.

The wireless power transmission apparatus 10 defined as the transmission side can execute a foreign object detection mode S40 and a soft start mode S50 through the eccentricity detection mode S20 and a stand-by mode S30.

In the soft start mode S50, prior to entry into the normal operation mode S60, detection of all the target objects 1 can be terminated and corresponding power can be wirelessly transmitted (S70).

The eccentricity detection mode S20 can be simultaneously executed when a user pushes a wireless power transmission mode icon or button of a user input unit, and the controller 190 can oscillate frequencies for determining whether the target object 1 is positioned on the upper glass 11 and predicting an alignment state.

In some implementations, a switching device of the inverter 140 can be alternately turned on and off to allow current to flow according to the oscillation frequency. Whether the target object 1 identified in the eccentricity detection mode S20 is a general heating container can be determined, and whether the target object 1 is a heating container can be determined while switching to a first operation frequency from a start frequency.

In the eccentricity detection mode S20, whether the target object 1 is present and whether the target object 1 has a coil can be determined, and when the coil is present, whether the reception coil 15 and the working coil 12 of the target object 1 are aligned with each other, that is, whether coils are positioned in concentricity or eccentricity can be additionally determined.

In the eccentricity detection mode S20, the wireless power transmission apparatus 10 can attempt wireless communication with the target object 1, and reception through wireless communication can be started by communication pairing when power of a small home appliance that is the target object 1 is supplied in the foreign object detection mode.

An idle mode can be defined as a start mode in which the controller 190 is activated by supplying power to a driving module including the controller 190 of the wireless power transmission apparatus 10 for induction heating when a user pushes and turns on a power button through a user input unit.

In the idle mode, wired communication between the user input unit and the driving module can be performed.

The stand-by mode S30 can be an operation after the eccentricity detection mode S20, and can be defined as a frequency change period in which the inverter 140 is driven at a second operation frequency in order to determine a foreign object when the target object 1 is present in a region for wireless power transfer.

In some implementations, in the stand-by mode S30, frequency sweep can occur from an initial operation frequency to a second operation frequency, and when the second operation frequency is reached, a current mode can substantially enter the foreign object detection mode S40.

In some implementations, the second operation frequency may not oscillate from the beginning because oscillation needs to be sequentially induced since driving noise is generated when the apparatus is driven at the second operation frequency, that is, a lower frequency than the initial operation frequency in a state in which a voltage of a DC link is charged.

The foreign object detection mode S40 can be defined as a period in which induced voltage information of the target object is received and whether a foreign object is present in a state in which the apparatus is driven at the second operation frequency and communication pairing with a reception side, that is, the target object 1 is performed.

In some implementations, when the foreign object is determined to be present, the apparatus can enter the idle mode again and information indicating that the foreign object is present can be signaled to a user, and when there is no foreign object, the apparatus can enter the soft start mode S50.

For example, a state that is activated by injecting power into the reception side, that is, the target object 1 due to induced current from the foreign object detection mode S40 can be defined as a wakeup mode, and in this case, wireless communication is paired between the reception side and the transmission side and communication can begin therebetween.

The soft start mode S50 can be defined as a period in which power of a level requested by the target object 1 is changed to a frequency corresponding to corresponding power for an operation in the wireless power transmission apparatus 10.

When the power of the level requested by the target object 1 is approximately reached in the soft start mode S50, a current mode can enter the normal operation mode S60.

In the soft start mode S50, an additional detection mode S90 can be executed.

The additional detection mode S90 can be defined as a period in which additional detection is performed for recheck prior to power transfer of a small home appliance.

For example, in the additional detection mode, a mode that is actually selected by a user can be rechecked, and whether there is an error of judgment between no load and a small home appliance can be rechecked.

The normal operation mode S60 can be defined as a period in which change in requested output is monitored and whether there is a difference between actual output and the requested output can be determined with a constant level at power of the level requested by the target object 1.

In some implementations, when there is the difference between the actual output and the requested output, if the actual output is lower than the requested output, a power up mode can proceed to lower an operation frequency and to increase output, and if the actual output is higher than the requested output, a power down mode can proceed to increase the operation frequency and to lower the output.

At a side of the target object 1, according to user operation selection and operation time of the target object 1 or according to request for low power or high power, the controller 190 can perform an operation using requested output based on the request.

Prior to the normal operation mode while the aforementioned modes are sequentially or inversely performed, the state of the target object 1 can be preferentially determined in the preparation period.

Hereinafter, an after a target object detection mode will be described in detail with reference to FIGS. 7 to 13.

Figure 7:
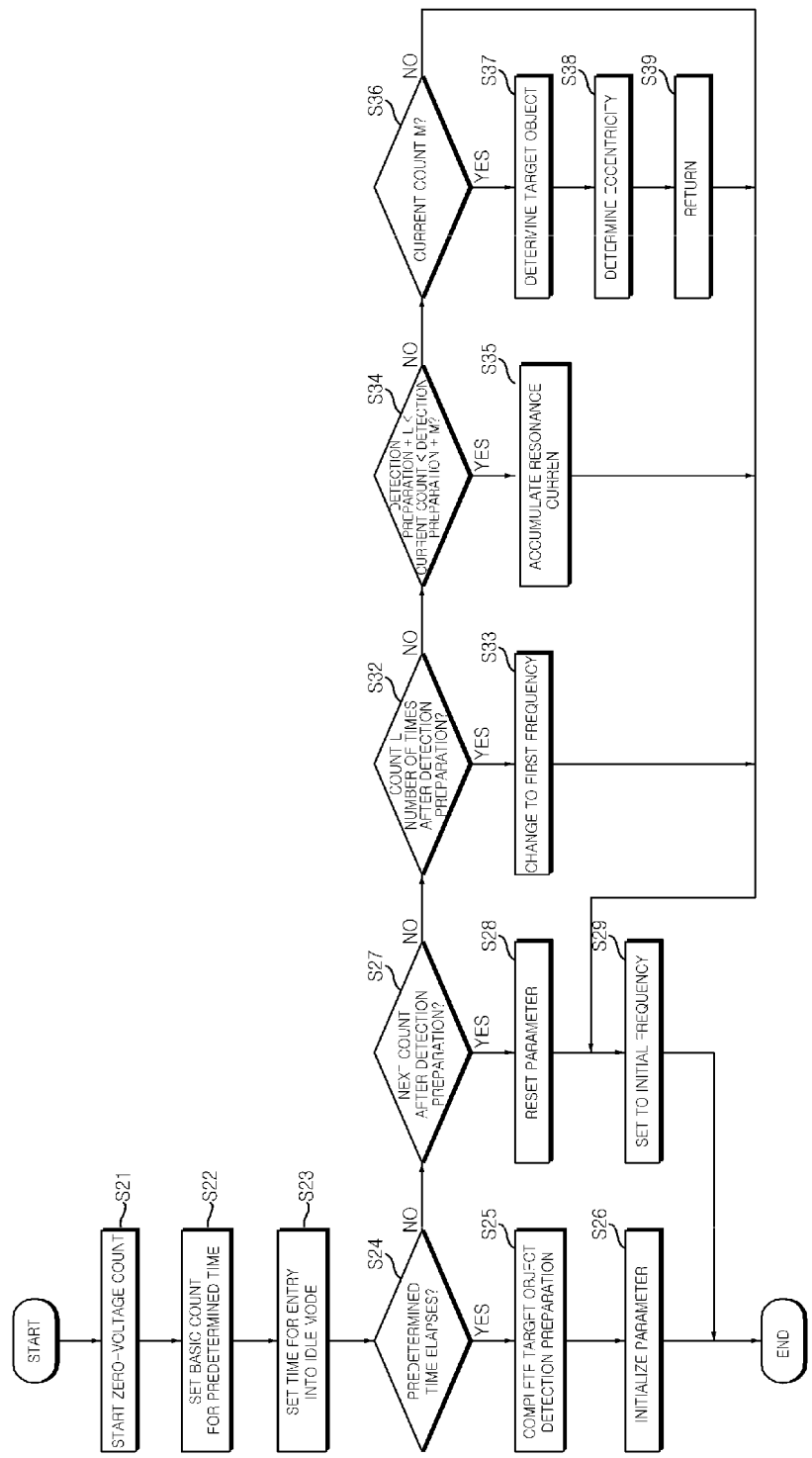
FIG. 7 is a schematic flowchart in a wireless power transmission mode of an exemplary wireless power transmission apparatus for induction heating.
Figure 8:
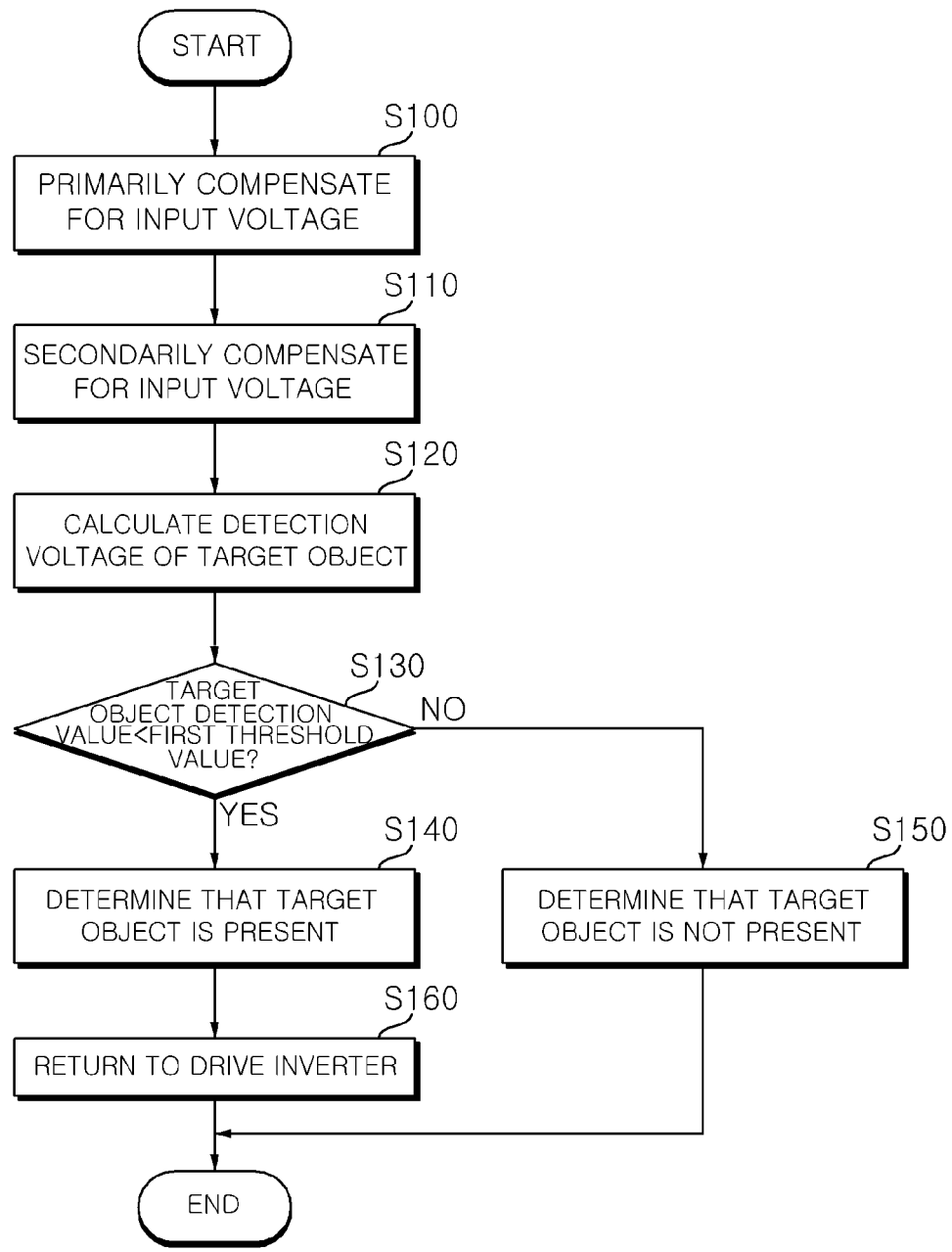
FIG. 8 is a flowchart for determining a target object in FIG. 7.
Figure 9:
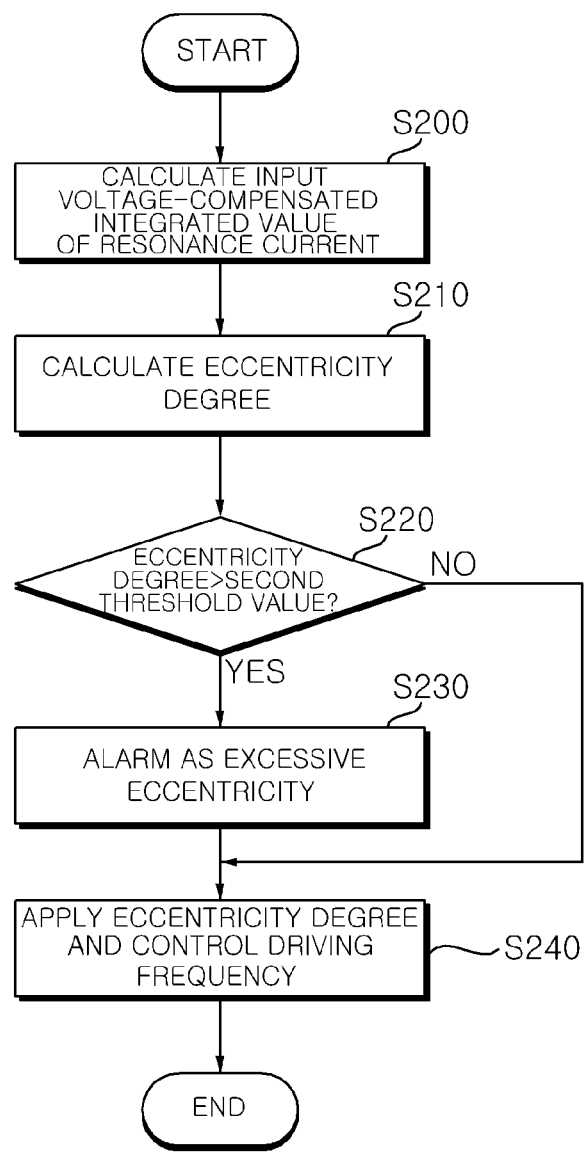
FIG. 9 is a flowchart for determining an eccentricity degree in FIG. 7.
Figure 10:
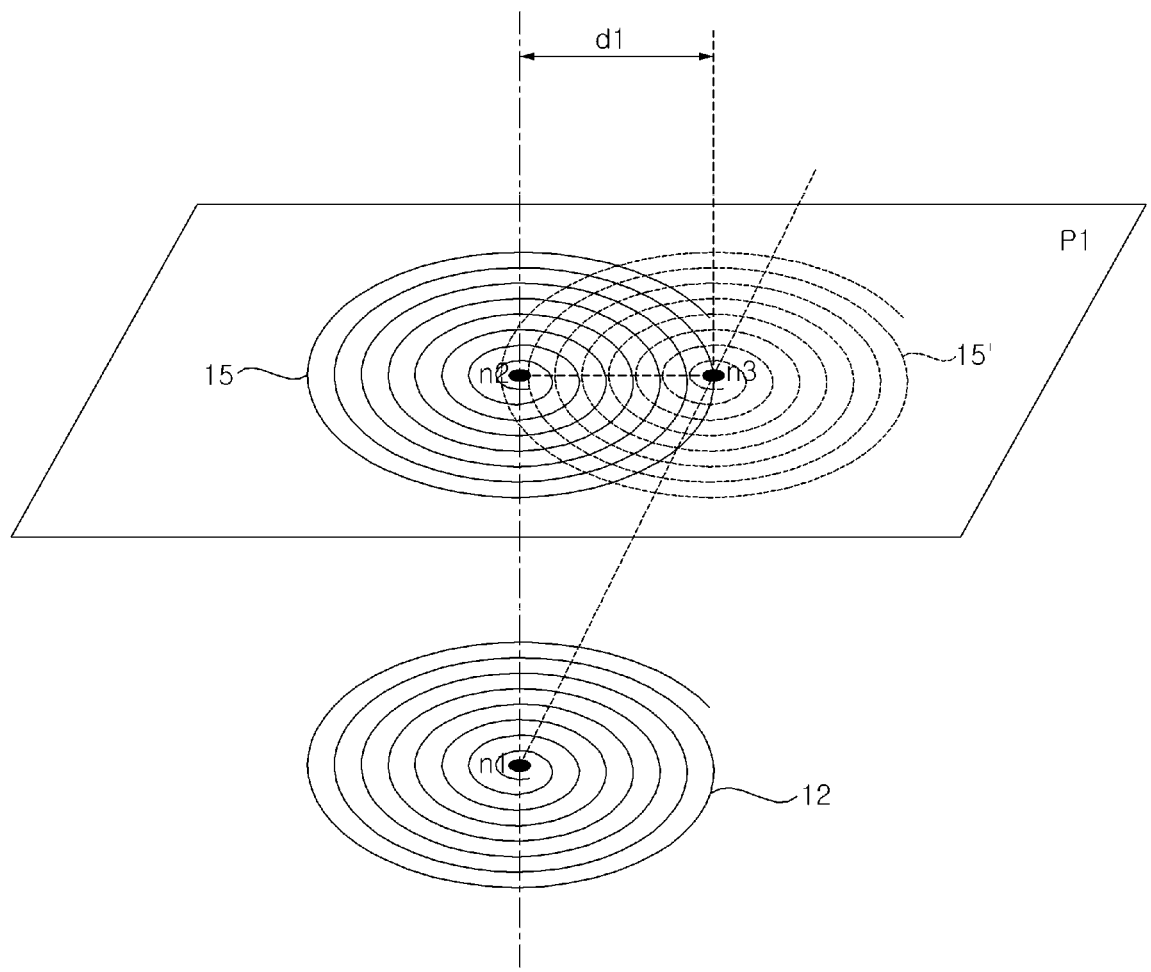
FIG. 10 is a state diagram illustrating an alignment state between a reception coil and a working coil.

FIG. 7 is a schematic flowchart in a wireless power transmission mode of a wireless power transmission apparatus for induction heating. FIG. 8 is a flowchart of determination of a target object of FIG. 7. FIG. 9 is a flowchart of determination of an eccentricity degree of FIG. 7. FIG. 10 is a state diagram showing an alignment state between a reception coil and a working coil.

Referring to FIG. 7, the wireless power transmission apparatus 10 for induction heating can change a frequency to a first operation frequency from a start frequency in an eccentricity detection mode, and can classify the target object 1 at a first operation frequency into a general heating container, and a small home appliance having no reception coil.

For the small home appliance having a reception coil, the target object 1 can also be classified into a foreign object, and no load (which means that no object is positioned on the upper glass 11), and a method of classifying such appliance will be described below.

The start frequency can be a set basic frequency and can be, for example, about 75 kHz.

First, as shown in FIG. 7, zero-voltage count can be started with respect to a switching signal provided to a switching device of the inverter 140 (S21).

In some implementations, the zero-voltage count can be defined as performing detection at a time at which a rectified reference voltage applied at 120 Hz is 0 V after commercially available power that is reference power of the wireless power transmission apparatus 10 for induction heating is full-wave rectified with respect to a reference voltage of 60 Hz.

As such, detection or count can be performed when the reference voltage is 0, and thus, an output value for minimizing influence of an input reference voltage can be calculated.

In some implementations, the input reference voltage can be commercially available power, and thus, a description will be given based on 120 Hz that is a frequency of the rectified voltage. In some implementations, the frequency of the rectified voltage may not be 120 HZ, and it would be understood that detection or count can be performed when the reference voltage is 0.

In some implementations, count can be configured to be performed at 120 Hz, that is, every 8.33 ms. In some implementations, the count can be configured to be performed at a frequency other than 120 Hz.

When the eccentricity detection mode begins, the controller 190 can perform zero-voltage count to find an accurate zero-voltage time from a start time of the eccentricity detection mode, that is, a time point of receiving a mode selection signal from a user input unit.

The controller 190 can start zero-voltage count for a predetermined time and can enhance the accuracy of zero-voltage count to reduce error (S22). In some implementations, the predetermined time can be at least one second and can be set to a time that is not greater than 3 seconds.

When there is no counted value for a reference time, the controller 190 can set a reference time of entry into an idle mode (S23).

The reference time can be set to 3 seconds as a maximum value for the predetermined time.

The controller 190 can perform count of reading input current at each zero-voltage time.

In some implementations, the input current can refer to current supplied to a reception coil, that is the working coil 12 (hereinafter, 150), and whether the target object 1 has the reception coil 15 or whether eccentricity occurs can be determined by reading corresponding input current and integrating the input current in predetermined counts.

For example, when zero-voltage count is performed, all counts can be performed for a predetermined time, e.g., 1 second, and 1 second elapses (S24), eccentricity detection preparation can be determined to be completed (S25) and all parameters can be initialized (S26). In some implementations, the parameter can be reset and initialized, for example, blank processing of a timer and flag value.

As such, when a predetermined time elapses, preparation can be determined to be completed and a next count can be performed.

The controller 190 can perform zero-voltage count in a next period when a predetermined time elapses, that is, can perform count at 1 second+8.33 ms (S27).

In some implementations, each parameter can be reset (S28), and a frequency of a switching signal applied to the inverter 140 can be set to an initial frequency and a switching device of the inverter 140 can be driven (S29).

For example, when the initial frequency is 75 kHz, the frequency of the switching signal can be set to 75 kHz. In some implementations, only count can be performed and detection of input current may not be performed in zero-voltage count.

When a switching device of the inverter 140 begins to be driven at an initial frequency, such driving at the initial frequency can be continuously performed for a predetermined time.

The predetermined time can be arbitrarily set but the driving at the initial frequency can be maintained up to change to a next operation frequency. For example, the switching device of the inverter 140 can be driven at the initial frequency until a first count is performed after 1 second that is a detection preparation time.

A capacitor 130 can be charged while only zero-voltage count is performed without detection of input current.

When a first count is performed after 1 second that is a detection preparation time through zero-voltage count (S32), the controller 190 can change a switching signal of the inverter 140 to satisfy the first operation frequency and can drive the inverter 140 at the first operation frequency (S33).

In some implementations, the first operation frequency can be used to determine whether eccentricity occurs and whether the target object 1 has the reception coil 15, can be a threshold frequency at which overcurrent is not exerted, and can be, for example, 55 kHz.

However, the first operation frequency is a lower frequency than the initial frequency, and can be a higher frequency than a second operation frequency at which wireless power transfer is performed.

When a frequency of the inverter 140 is changed to the first operation frequency, the controller 190 can read resonance current in each count until a current count is between a first count after 1 second that is an initial preparation time and $m^{th}$ count after 1 second that is an initial preparation time (S34). Resonance current can be defined as current flowing in the working coil 12 according to the switching signal of the inverter 140.

In some implementations, the controller 190 can integrate resonance current read in respective counts (S35).

For example, the integrated resonance current can be resonance current corresponding to $(m-1)^{th}$.

For example, when $1^{th}$ satisfies 8th and $m^{th}$ satisfies $15^{th}$, the controller 190 can read resonance current flowing in the working coil 12 to a $14^{th}$ count from a $9^{th}$ count and can perform integration thereon.

When a current count is an $m^{th}$ count after 1 second that is an eccentricity detection preparation, the controller 190 can terminate count (S36), can re-change a frequency of the inverter 140 to an initial frequency, and can perform primary determination on the target object 1 based on the integrated value (S37).

When the target object 1 is determined to have the reception coil 15, an alignment state between the reception coil 15 of the target object 1 and the working coil 12 can be determined (S38).

In some implementations, the eccentricity detection mode can include an $m^{th}$ count, and when m is 15, about 125 ms may be taken. In some implementations, different time can be taken when m is 15.

The eccentricity detection mode can be repeatedly performed over a plurality of number of times, but a number of times and a time may not be specified.

The controller 190 can determine the target object 1 and eccentricity based on resonance current values integrated up to an $m^{th}$ count, and such determination will be described with reference to FIGS. 8 and 9.

First, with reference to FIG. 8, determination of the target object 1 will be described.

Referring to FIG. 8, when an $m^{th}$ count is performed, the controller 190 can receive an integrated value of resonance current detected a plurality of number of times, that is, (m−1) number of times as a primary determination result (S100).

In some implementations, the primary determination result can be received, this can be compensated for, and whether the target object is a small home appliance including a reception coil, or an object having no reception coil.

The object having no reception coil can be a small home appliance having no reception coil, no-load, or a heating container.

In some implementations, an integrate value of resonance current of (m−1) number of times as a base value of determination of a target object can refer to an integrated value of resonance current.

The controller 190 can determine any one group to which the target object 1 belongs among the three groups based on the integrated value of resonance current.

In some implementations, the controller 190 can appropriately compensate for the integrated value of resonance current and can calculate the compensated integrated value of resonance current, thereby enhancing the accuracy of determination.

In some implementations, a predetermined difference in an integrated value of resonance current can be generated depending on an input voltage value of supplied commercially available power, that is, reference power, and in order to compensate for this, a compensated value of resonance input current can be calculated by applying the following compensation equation (S101).

Compensated integrated value of resonance current=reference value+integrated value of resonance current−first input voltage compensated value−second input voltage compensated value   [Equation 1]

The compensation equation can be selected based on data in a no-load state when input voltage is 253 V, and here, the reference value can be a predetermined integer.

For example, the reference value can be 519. In some implementations, the reference value can be a value other than 519.

The compensation equation can be derived from Table 1 below.

TABLE 1

| Input Voltage | | V187 | | V220 | | V253 | |
|---|---|---|---|---|---|---|---|
| Parameter | | I_input | I_55k | I_input | I_55k | I_input | I_55k |
| WPT | None | 359 | 407 | 366 | 427 | 376 | 454 |
| All-Clad | 8 inches | 750 | 444 | 858 | 484 | 970 | 487 |
| Minimum heating container(145 mm) | | 683 | 401 | 782 | 420 | 888 | 445 |
| Test piece (Iron Bar) | | 362 | 358 | 374 | 363 | 387 | 375 |
| Rice cooker with RX_Side Coil | 8T/ Constancy | 469 | 453 | 513 | 457 | 555 | 476 |
| | 8T/ eccentricity | 431 | 406 | 466 | 418 | 502 | 434 |
| | 11T/ Constancy | 430 | 417 | 465 | 430 | 500 | 450 |
| | 11T/ eccentricity | 408 | 395 | 437 | 406 | 468 | 421 |
| | 14T/ Constancy | 408 | 406 | 437 | 418 | 466 | 434 |
| | 14T/ eccentricity | 392 | 387 | 416 | 400 | 442 | 411 |
| Electric kettle | Constancy | 438 | 363 | 480 | 373 | 522 | 384 |
| | eccentricity | 415 | 351 | 445 | 357 | 479 | 363 |
| Wireless Toaster | Constancy | 555 | 305 | 361 | 304 | 368 | 308 |
| | eccentricity | 362 | 400 | 370 | 417 | 380 | 442 |
| Wirless Blender | Constancy | 355 | 320 | 362 | 321 | 369 | 329 |
| | eccentricity | 360 | 387 | 368 | 404 | 377 | 424 |

As shown in Table 1 above, integrated values of input current of (m−1) number of times depending on input voltage on a plurality of small home appliances are shown in I_input, and I_55k shows the sum of resonance current at a first operation frequency of 55 kHz.

In this case, this shows the sum of resonance current and the sum of input current in the case of eccentricity and concentricity with respect to each small home appliance, WPT indicates a no-load state, and a test piece can have no foreign object.

In some implementations, when the input voltage is not 253 V and when the input voltage is 287 V or 220 V, the corresponding compensation equation can be applied, the target objects 1 can be compared, and whether eccentricity occurs can be determined. In some implementations, when input voltage is smaller than 253 V, the variation in the integrated values of resonance current can also be increased to clearly identify the target object 1 and an eccentricity degree.

To this end, a first input voltage compensated value can be calculated according to Equation 1 above (S100).

In some implementations, the first input voltage compensated value can be calculated according to Equation 2 below.

First input voltage compensated value=2*input voltage(RMS)   [Equation 2]

Then, a second input voltage compensated value can be calculated according to Equation 3 below (S110).

Second input voltage compensated value=$p$*input voltage(RMS)/$2^k$   [Equation 3]

In some implementations, p and k can be positive integers. For example, p can be 290, and k can be 10.

In some implementations, when the first and second input voltage compensated values are calculated, an integrated value of compensated resonance current can be calculated by applying the calculated values to Equation 1 above (S120).

The integrated value of compensated resonance current can be a target object detection value and can be defined as a value calculated according to Equation 1 above.

In some implementations, the target object detection value can represent a degree by which the reference value, that is, a value of 519 is lowered when an input voltage of commercially available power is greater or smaller than 253 V.

Thus, the reference value can be required not to be a negative value due to the input voltage and can be 519.

Whether a target object is present can be determined based on the calculated integrated value of compensated resonance current, that is, the target object detection value (S130).

For example, as shown in FIG. 8, whether the target object detection value is smaller than a first threshold value can be determined.

When the target object detection value is smaller than the first threshold value, the target object can be determined to be a small home appliance having the reception coil 15 (S140).

For example, when the reception coil of the target object is present, inductance can be formed to reduce a value of resonance current, and thus, a first threshold value thereof can be set and whether the target object is the small home appliance having the reception coil 15 can be determined based on the set first threshold value.

When the target object detection value is not the first threshold value, the target object can be determined to an object having no reception coil 15, for example, a small home appliance having no reception coil, no-load, a foreign object, or a general heating container (S150). In this case, entry into the idle mode may be guided.

When identification of the target object is terminated, a frequency for driving the inverter 140 can be adjusted again, and then, next determination can be performed, that is, whether eccentricity occurs can be determined (S160).

In some implementations, when the target object 1 is determined to be a small home appliance having the reception coil 15, an alignment state between the reception coil 15 and the working coil 12 can be determined.

Such determination of the alignment state between the reception coil 15 and the working coil 12 will be described with reference to FIGS. 9 and 10.

First, determination of whether the reception coil 15 and the working coil 12 are aligned with each other will be described with reference to FIG. 10, in this regard, as schematically shown in FIG. 10, assuming that the central points n1 and n2 of the respective coils, that is, the central point n2 of the reception coil 15 and the central point n1 of the working coil 12 are positioned on the single plane, an eccentricity amount d1 can be defined as a straight distance between the two central points In some implementations, for wireless power transfer of a small home appliance having the reception coil 15, for example, a blender or an oven toaster, the reception coil 15 needs to be aligned with the working coil 12 at a short distance that satisfies a predetermined distance.

Alignment can be defined as concentricity, that is, a state in which the two central points n1 and n2 are homocentric on the single plane assuming that the two coils 12 and 15 are positioned on the single plane p1, that is, a state in which the central point n2 of the reception coil 15 and the central point n1 of the working coil 12 are homocentric on an axis perpendicular to an imaginary single plane P1.

Eccentricity corresponding to the case in which central points n1 and n3 of the two coils 12 and 15 are not homocentric on the axis perpendicular to the imaginary single plane P1, and as shown in FIG. 10, a distance d1 between the two central points n1 and n3 on the imaginary single plane P1 can be defined as an eccentricity degree.

Thus, the eccentricity degree can be defined as the straight distance d1 on the imaginary single plane and may not be a diagonal distance on difference planes.

In some implementations, in order to smoothly perform wireless power transfer between the two coils 12 and 15, the eccentricity degree needs to be a predetermined range or less, and as the eccentricity degree is increased, transmission efficiency of wireless power transfer may be lowered.

Thus, the present disclosure proposes a method of determining an eccentricity degree, compensating for this, and wirelessly transmitting power prior to wireless power transfer.

To this end, referring to FIG. 9, in the integrated value of resonance current, in which the input voltage calculated in identification of the target object is compensated for, can be read (S200).

Such the integrated value of compensated resonance current can be used by reading a value in Equation 1 above.

Then, the eccentricity degree can be calculated using the integrated value of compensated resonance current according to Equation 4 below (S210).

$$\text{Eccentricity degree} = A * I_{res\_sum\_comp}/2^B - I_{res\_sum\_comp} * I_{res\_sum\_comp}/2^C - I_{res\_sum\_comp} * I_{res\_sum\_comp}/2^D - E \quad \text{[Equation 4]}$$

In some implementations, A, B, C, D, and E can be a positive integer. For example, A can be 876, and B and C can be the same value, e.g., 9.

D can be an integer greater than B and C and can be 10, and E can be for adjusting a value, and can be, for example, 306.

Such Equation 4 is an equation for deriving a second-order linear regression equation based on the result of Table 2 below, and a test in terms of eccentricity is performed only in the case in which eccentricity degrees are 0, 10, 15, 20, and 25, respectively, but it is assumed that linear continuity between data is present.

TABLE 2

| Alignment state of reception coil | Resonance current_55 kHz operation frequency | Predicted eccentricity (mm) |
|---|---|---|
| Concentricity (0 mm) | 276 | 1 |
| | 276 | 1 |
| | 276 | 1 |
| | 276 | 1 |
| Eccentricity (10 mm) | 293 | 10 |
| | 294 | 9 |
| | 294 | 9 |
| | 294 | 9 |
| Eccentricity (15 mm) | 312 | 16 |
| | 312 | 16 |
| | 312 | 16 |
| | 312 | 16 |
| Eccentricity (20 mm) | 330 | 22 |
| | 330 | 22 |
| | 330 | 22 |
| | 330 | 22 |
| Eccentricity (25 mm) | 348 | 26 |
| | 348 | 26 |
| | 348 | 26 |
| | 348 | 26 |

As such, when the calculated eccentricity degree is greater than a second threshold value, excessive eccentricity can be determined to occur (S220).

For example, the second threshold value for determining excessive eccentricity can be assumed to be 27 mm, and in the case of a distance equal to or greater than 27 mm, the controller 190 can guide arrangement through a user alarm (S230).

When the eccentricity degree is equal to or less than the second threshold value, the eccentricity degree can be applied to control an operation frequency and to control transmission power (S240).

Hereinafter, a method of controlling transmission power will be described with reference to FIGS. 11 and 12.

Figure 11:
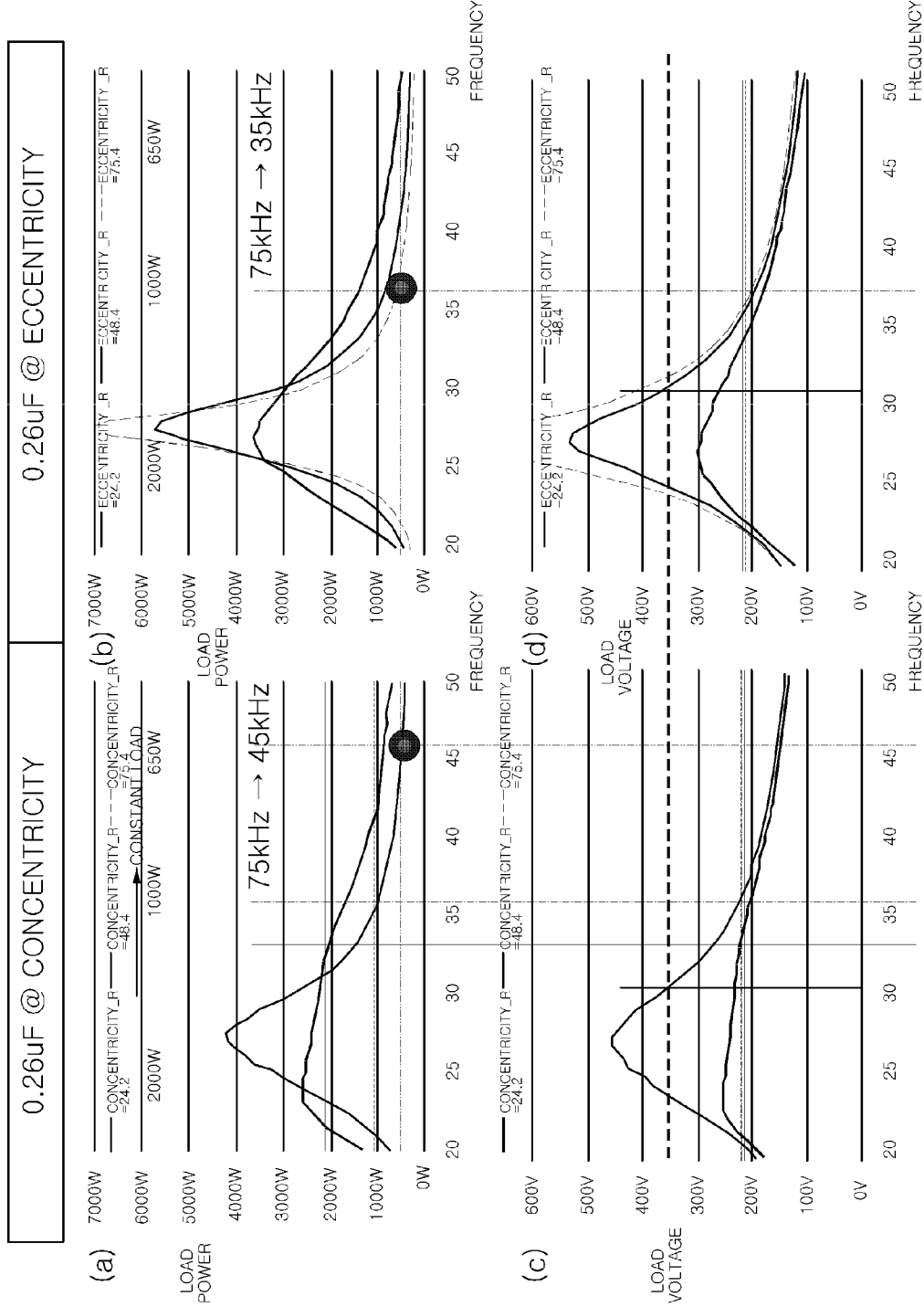
FIG. 11 is a graph illustrating a difference in a load output value in eccentricity and concentricity.

FIG. 11 shows a load output and load voltage depending on concentricity and eccentricity in various test pieces.

A left graph shows an operation frequency in concentricity depending on a diameter of a test piece, and a right graph shows an operation frequency in eccentricity depending on a diameter of a test piece.

Although there may be a slight difference in a resonance frequency depending on a diameter of each test piece, when eccentricity occurs, an operation frequency for achieving generally desired output power at eccentricity can be reduced. For example, as eccentricity becomes serious, a coupling factor among wireless power transmission parameters can be reduced, thereby reducing power transmission efficiency. Thus, power transmitted during an operation at the same operation frequency can be highly reduced. Thus, a long time can be taken to achieve desired output power.

Thus, when power is wirelessly transmitted to a wireless small home appliance that needs a rapid response, it may not be possible to embody desired performance using such a long response.

In some implementations, an eccentricity degree can be calculated, and thus, in order to compensate for such output power based on the calculated degree, the apparatus can be controlled to vary an operation frequency and to transmit power.

Figure 12A:
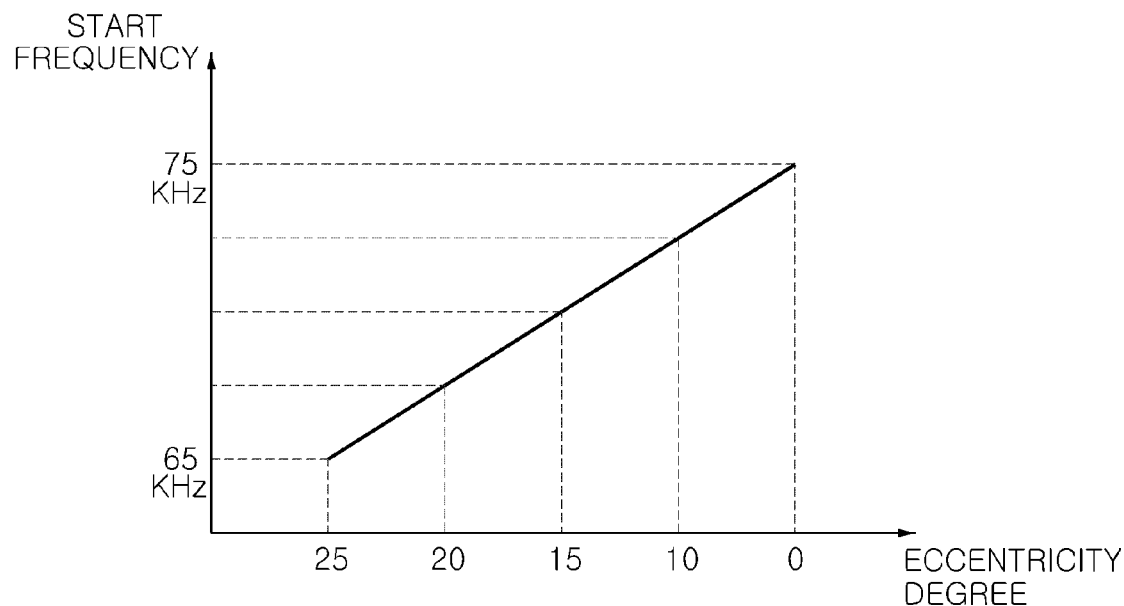
FIGS. 12A and 12B are graphs illustrating a compensation method depending on an eccentricity degree.

For example, as shown in FIG. 12A, the start frequency can be varied and set until an operation frequency for wireless power transfer depending on an eccentricity degree is reached.

For example, an operation frequency required to transmit the same requested power can be changed depending on an eccentricity degree as shown in FIG. 11, and as the eccentricity degree is increased, a last operation frequency can be lowered, and thus, when the start frequency is the same, a long time may be taken up to a last operation frequency.

Thus, the start frequency can be varied and set depending on the eccentricity degree, and for example, as shown in FIG. 12A, when the eccentricity degree is 0, the start frequency can be set to 75 kHz, and when the eccentricity degree is 25 mm, the start frequency can be set to 65 kHz.

Such a relationship between the eccentricity degree and the start frequency can be set and stored with respect to each eccentricity degree in the look-up table, and can be stored as a functional relation as shown in FIG. 12A.

Thus, as an eccentricity degree is increased, a start frequency can lowered, and thus, a time taken to enter the last lowest operation frequency can be reduced.

Figure 12B:
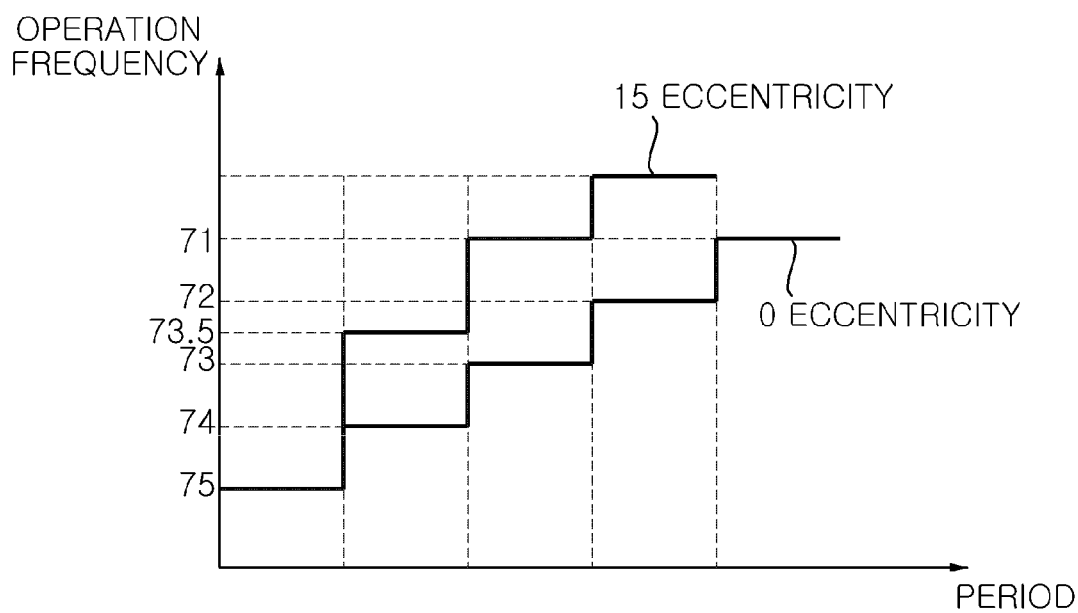

The controller 190 can set the start frequency to be the same and can set the swept frequency interval to be different depending on the eccentricity degree as shown in FIG. 12B.

For example, when eccentricity is 0, an operation frequency can enter the last operation frequency via sweep by 1 kHz, and when eccentricity is 15, the operation frequency can enter the last operation frequency via speed by 1.5 kHz, and thus, as eccentricity is increased, the swept frequency interval can be increased, and accordingly, the apparatus can be controlled to enter the last lowered operation frequency within a short time.

As such, the eccentricity degree can be calculated, and thus, a start frequency or a frequency interval can be controlled during wireless power transfer to effectively enter a last operation frequency within a short time.

Thus, the present disclosure can provide a wireless power transmission apparatus for transmitting power within a short time by ensuring power transmission efficiency even if eccentricity occurs by a predetermined degree.

As described above, in an eccentricity detection mode executed in a preparation period prior to a normal mode, whether a target object is present and whether eccentricity occurs can be clearly determined via comparison in the compensated integrated value of resonance current.

When determination up to FIG. 12 is completely terminated, the method can return back to operation S39 of FIG. 7.

Figure 13:
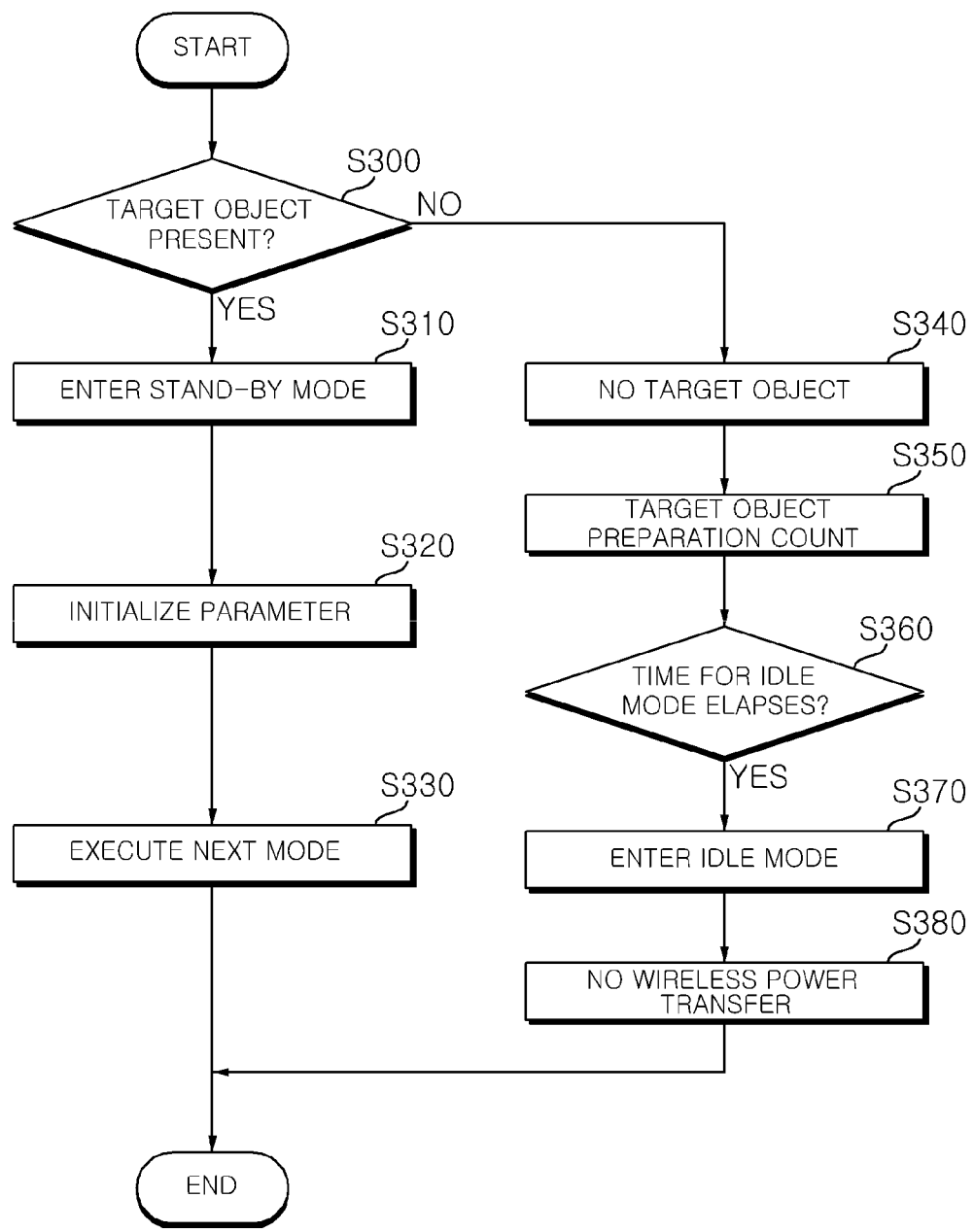
FIG. 13 is a flowchart for explaining an operation after determination of an eccentricity degree.

Operations after determination of eccentricity will be described with reference to FIG. 13.

As shown in FIGS. 8 and 9, a target object and whether eccentricity occurs can be determined (S300), and when the target object has a reception coil, an initial frequency can be set or a frequency seep interval can be set depending on an eccentricity degree, and a current mode can enter a stand-by mode according to a corresponding frequency (S310).

In the stand-by mode, a frequency can be swept depending on a corresponding frequency and a set parameter can be initialized (S320), and a current mode can enter a foreign object detection mode and a soft start mode that are next modes (S330).

When the target object 1 is not present (S340), whether a predetermined time for an idle mode executed in a detection preparation operation of the target object 1 can be counted again (S350).

For example, when zero-voltage count is started again and a predetermined time for the idle mode elapses (S360), a current mode can enter the idle mode (S370), and it can be determined that wireless power transfer is not present and an operation can be determined (S380).

As such, in a preparation period, an eccentricity degree can be determined, and in a soft start mode, a start frequency or a frequency sweep interval can be set depending on an eccentricity degree and power can be transmitted according to corresponding control, and accordingly, power for which an eccentricity degree is compensated can be transmitted.

Thus, when the user selects the wireless power transmission mode, if the target object 1 is the small home appliance having the reception coil 15, the current mode can enter the soft start mode, desired power information can be received through communication with the small home appliance having the reception coil 15, which is the target object 1, and a last operation frequency can be switched to a frequency corresponding to target power, and in this case, the eccentricity degree can be compensated for by setting an initial frequency for entry into the last operation frequency and setting a frequency sweep interval, and thus, it can be possible to transmit corresponding output for a short time.

In the case of transition to an operation frequency close to the target power, power of the target power can be wirelessly transmitted to the target object 1 in the normal operation mode.

As such, the current mode can enter the normal operation mode, wireless power transfer can be performed on the small home appliance having a reception coil but may not be performed on no-load, a foreign object, or a general heating container, and the current mode can enter the idle mode and the operation can be stopped.

Thus, while an operation is performed in a predetermined mode in a power transfer preparation period prior to the normal operation mode, desired requested output can be transmitted for a short time by determining whether a target object is present, calculating an eccentricity degree, and compensating for the eccentricity degree.

As described above, the multi-functional wireless power transmission device using one working coil can determine whether eccentricity occurs in a target object, can compensate for the occurrence of the eccentricity, and can perform wireless power transfer (WPT) in the wireless power transmission mode while selectively driving the wireless power transmission mode or the induction heating mode.

Even if information is not received from a positioned target small home appliance when user mode selection is a wireless power transmission mode, whether eccentricity occurs can be determined, and thus, it can be possible to compensate for eccentricity prior to power transfer.

As such, the present disclosure can provide a wireless power transmission apparatus for providing an alarm to a user prior to wireless power transfer when a wireless power transmission mode is selected, if a target object is a small home appliance having a reception coil and excessive eccentricity occurs between the corresponding reception coil and a working coil of a transmission side. In this case, whether a foreign object is present as well as whether eccentricity occurs can be determined, and thus, a user alarm can also be provided.

In addition, when wireless power transfer is performed depending on an eccentricity degree, a start frequency of frequency sweep can be controlled or a sweep interval can be controlled, and thus, wireless power transfer to which an eccentricity degree is applied can be performed, thereby enhancing power transmission efficiency.

What is claimed is:

1. A wireless power transmission apparatus for induction heating comprising:
    a working coil that is configured to change operation based on selection of a mode of operation from among a plurality of operating modes, the plurality of operating modes including a wireless power transmission mode configured to wirelessly transmit power and a heating mode configured to heat one or more objects;
    an inverter that is configured to output, to the working coil, current at an operation frequency;
    a controller that is configured to:
        calculate an eccentricity degree between the working coil and a reception coil of a target object, and
        control, in the wireless power transmission mode, the operation frequency based on the calculated eccentricity degree in a preparation period prior to wireless power transmission to the target object;
    an upper glass arranged to receive the target object; and
    an input unit configured to receive the selection of the mode of operation,
    wherein the controller operates in the preparation period prior to a normal wireless power transmission mode configured to perform the wireless power transmission to the target object, and
    wherein the controller is configured to:
        determine, in the preparation period, (i) whether the target object includes the reception coil and (ii) the eccentricity degree,
        enter an eccentricity detection mode to control the operation frequency and determine (i) whether the target object includes a reception coil and (ii) the eccentricity degree,
        read resonance current of the working coil, and
        determine, in the eccentricity detection mode, (i) whether the target object includes the reception coil and (ii) the eccentricity degree.

2. The wireless power transmission apparatus of claim 1, wherein the controller is configured to:
    read the resonance current a plurality of times for a predetermined time,
    perform integration on the resonance current, and
    determine (i) whether the target object includes the reception coil and (ii) the eccentricity degree based on an integrated value of the resonance current.

3. The wireless power transmission apparatus of claim 2, wherein the controller is configured to:
    compensate for the integrated value of the resonance current depending on amplitude of main power of the wireless power transmission apparatus for induction heating.

4. The wireless power transmission apparatus of claim 3, wherein the controller is configured to:
    calculate the compensated integrated value with respect to the integrated value of the resonance current, and
    based on the compensated integrated value being less than a first threshold value, determine that the target object includes the reception coil.

5. The wireless power transmission apparatus of claim 4, wherein the eccentricity degree is calculated based on the integrated value of the resonance current, and
    wherein, based on the calculated eccentricity degree being equal to or less than a second threshold value, the operation frequency is controlled depending on the eccentricity degree.

6. The wireless power transmission apparatus of claim 5, wherein the controller is configured to count the resonance current at a zero-voltage point of the main power.

7. The wireless power transmission apparatus of claim 6, wherein the operation frequency is controlled to be swept to a last operation frequency by lowering a start frequency for wireless power transmission as the eccentricity degree is increased.

8. The wireless power transmission apparatus of claim 6, wherein the operation frequency is controlled to be swept to a last operation frequency by setting a deviation for sweep from a start frequency for wireless power transmission to be increased as the eccentricity degree is increased.

* * * * *